(12) United States Patent
Satoh (10) Patent No.: US 6,963,356 B2
(45) Date of Patent: Nov. 8, 2005

(54) IMAGE SEPARATOR AND STEREOSCOPIC DISPLAY UTILIZING THE SAME

(75) Inventor: Seiji Satoh, Kanagawa (JP)

(73) Assignee: Sony Corporation (JP)

( * ) Notice: Subject to any disclaimer, the term of this patent is extended or adjusted under 35 U.S.C. 154(b) by 493 days.

(21) Appl. No.: 10/168,615

(22) PCT Filed: Dec. 14, 2001

(86) PCT No.: PCT/JP01/10972

§ 371 (c)(1),
(2), (4) Date: Jun. 24, 2002

(87) PCT Pub. No.: WO02/054134

PCT Pub. Date: Jul. 11, 2002

(65) Prior Publication Data

US 2002/0191073 A1 Dec. 19, 2002

(30) Foreign Application Priority Data

Dec. 27, 2000 (JP) ......................................... 2000-397857

(51) Int. Cl.⁷ ............................................. H04N 13/04
(52) U.S. Cl. ...................................................... 348/51
(58) Field of Search ....................... 348/51; H04N 13/04

(56) References Cited

U.S. PATENT DOCUMENTS

| | | | | |
|---|---|---|---|---|
| 5,875,055 A | * | 2/1999 | Morishima et al. | 359/465 |
| 6,130,731 A | * | 10/2000 | Andersson et al. | 349/77 |
| 6,252,707 B1 | * | 6/2001 | Kleinberger et al. | 359/465 |
| 6,320,629 B1 | * | 11/2001 | Hatano et al. | 349/15 |
| 6,498,679 B2 | * | 12/2002 | Lee et al. | 359/483 |
| 2002/0118452 A1 | * | 8/2002 | Taniguchi et al. | 359/463 |

FOREIGN PATENT DOCUMENTS

| | | |
|---|---|---|
| JP | 9-304740 | 11/1997 |
| JP | 10-227998 | 8/1998 |
| JP | 10-268233 | 10/1998 |

* cited by examiner

*Primary Examiner*—Tung Vo
(74) *Attorney, Agent, or Firm*—Rader, Fishman & Grauer PLLC; Ronald P. Kananen (57) ABSTRACT

A polarizing plate (11) having a rightward and upward polarization angle is provided on a display screen (10), and a ½-wave plate (21) whose optical axis is at 45 deg. to said polarization angle is applied to said right half. A ½-wave plate (22) whose optical axis is orthogonal to that of said ½-wave plate (21) is applied to a right-eye side of a polarizing plate (12) (glasses) which has a leftward and upward polarization angle and which is to be worn by a viewer. Thus, images for left and right eyes can be viewed by left and right eyes through the ½-wave plates. The image for a right eye ($13_R$) that should not enter a left eye ($14_L$) is completely blocked by a polarization angle orthogonal thereto. The image for a left eye ($13_L$) that should not enter a right eye ($14_R$) is completely blocked to prevent crosstalk between the left and right images because the optical axes of the two phase difference plates (21, 22) are in an orthogonal state in which the coordinate axis is rotated 90 deg. to cancel the phase difference to realize an orthogonal light-blocking state of the polarizing plates (11, 12).

4 Claims, 7 Drawing Sheets

IMAGE SEPARATOR AND STEREOSCOPIC DISPLAY UTILIZING THE SAME

TECHNICAL FIELD

The present invention relates to an image separator for watching stereoscopic images on a display, e.g., a stereoscopic image display utilizing a liquid crystal display device and to a stereoscopic image display utilizing the same.

BACKGROUND OF THE INVENTION

Figure 5:
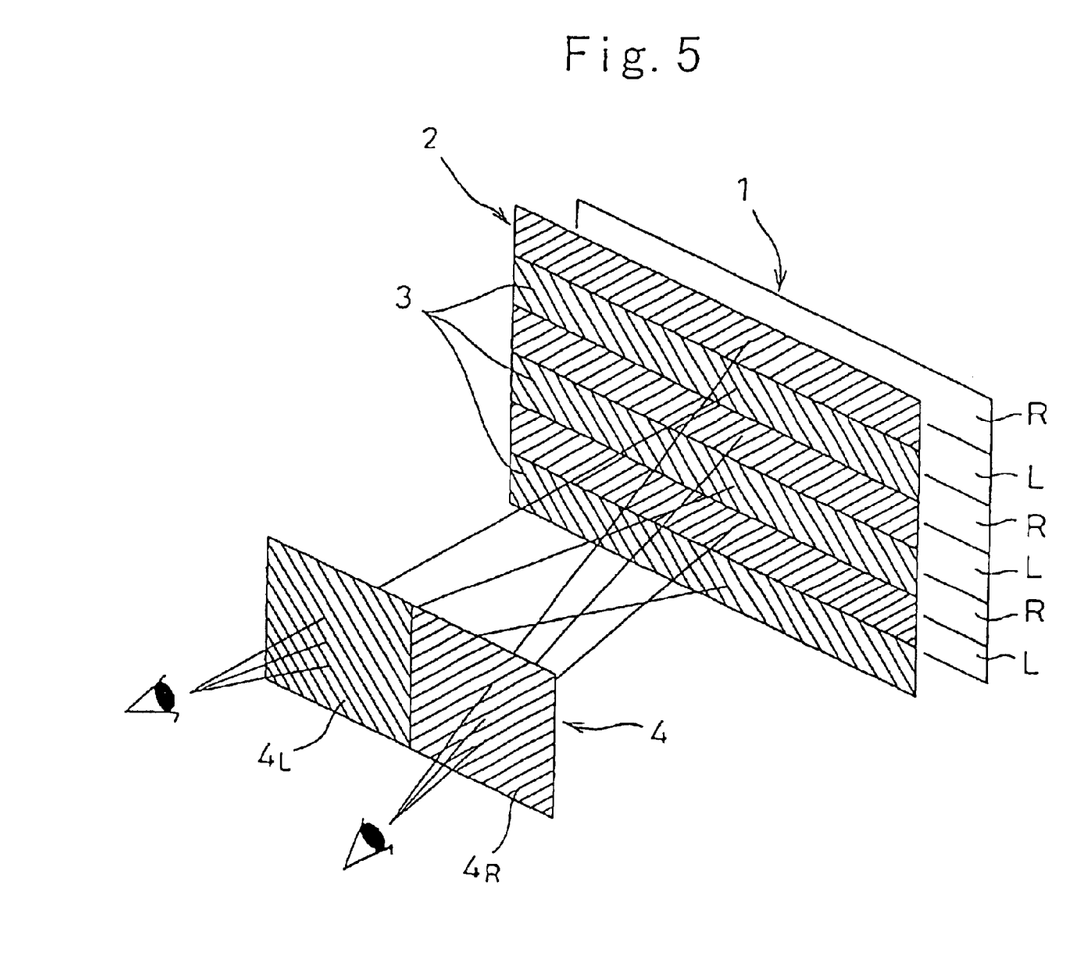
FIG. 5 is a configuration diagram showing an example of a conventional apparatus.

For example, conventional methods of watching a stereoscopic image using a display, e.g., a liquid crystal display include the configuration shown in FIG. 5. In this case, for example, stereoscopic images for a right eye and a left eye are alternately displayed on each horizontal line on a display screen 1 of a liquid crystal display. A unidirectional linear polarizing plate 2 (which is directed rightward and upward in the figure) is applied to the entire surface of the display screen 1. Further, ½-wave plates 3, 3, . . . having the function of rotating a polarization angle 90 deg. are disposed on every other horizontal line, e.g., on all horizontal lines in even-numbered places, on the surface of the linear polarizing plate 2. Therefore, polarizing plates whose polarization angles are orthogonal to each other are consequently provided on respective horizontal lines in the form of a reed screen, as illustrated.

A viewer wears polarization glasses 4 having a polarization angle that matches each horizontal line. The polarization glasses 4 are constituted by a glass $4_R$ for a right eye having a rightward and upward polarization angle and a glass $4_L$ for a left eye having a leftward and upward polarization angle. Therefore, an image for a right eye and an image for a left eye respectively enter the right eye and left eye of the viewer independently of each other. That is, the image for a left eye on the even-numbered lines whose polarization angle is rotated 90 deg. leftward and upward by the ½-wave plates 3, 3, . . . can not be seen through the right eye glass $4_R$ having the polarization angle directed upward to the right in the figure, and only the image for a right eye on the odd-numbered lines having a matching polarization angle can be seen.

On the contrary, the image for a left eye on the even-numbered lines whose polarization angle is rotated 90 deg. leftward and upward by the ½-wave plates 3, 3, . . . can been seen through the glass $4_L$ for a left eye having a leftward and upward polarization angle in the figure, although the image for a right eye on the odd-numbered lines whose polarization angle is orthogonal to the same can not be seen.

No problem occurs with said glass $4_L$ for a left eye because the image for a right eye is completely cut-off because of the polarization angle of said unidirectional linear polarizing plate 2. At the glass $4_R$ for a right eye, however, since the ½-wave plates 3, 3, . . . for rotating the rightward and upward polarization angle have wavelength dependence (the rotating angle depends on wavelengths), it is not possible to accurately rotate visible light 90 deg. in the entire region thereof. As a result, the image for a left eye that is unnecessary cannot be completely cut off, which has resulted in partial leakage of the image for a left eye to cause crosstalk.

DISCLOSURE OF THE INVENTION

It is an object of the invention to provide an image separator used in a stereoscopic image display with which an image for a left eye and an image for a right eye respectively enter left and right eyes completely independently of each other to allow a stereoscopic image to be viewed without crosstalk and a stereoscopic image display utilizing the same.

An image separator according to the invention is characterized in that it has a first polarizing plate provided on a display screen of a display, a first phase difference plate provided in a predetermined part of a front surface of said first polarizing plate, a second polarizing plate which is provided at a predetermined distance from said display and which has polarizing characteristics in an in transmissible relationship with said first polarizing plate, and a second phase difference plate which is provided in a predetermined part on a surface of said second polarizing plate toward the display and whose polarization angle is identical to that of said first phase difference plate in an absolute value and opposite to the same in an rotating direction.

It is also characterized in that said first phase difference plate and said second phase difference plate are provided in association with either of left and right divisions of an image display surface of the display.

It is also characterized in that said first phase difference plate is provided in association with either even-numbered or odd-numbered scan lines of said display and in that said second phase difference plate is provided in association with either of left and right divisions of the image display surface of said display.

According to the invention, a phase difference plate having an anisotropic molecular structure whose extending direction (optical axis) is at 45 deg. to a polarization angle is provided on a surface of either of two opposite polarizing plates whose polarization angles are in an orthogonal light-blocking state, and a part at which the polarization angle is rotated, for example, 90 deg. is made transmissible. The invention is characterized in that a phase difference plate which is orthogonal to the extending direction of said phase difference plate is provided in the transmissible part to cancel the phase difference, thereby eliminating the two phase difference plates equivalently to restore the initial light-blocking state.

The invention is also characterized in that it allows different parts of an image to be observed by left and right eyes respectively by providing a configuration in which, in a predetermined part on a polarizing plate having a polarization angle in one direction and applied on a liquid crystal display screen, there is provided a phase difference plate having an anisotropic molecular structure whose extending direction is at, for example, 45 deg. to the polarization angle of the polarizing plate to rotate the polarization angle 90 deg; a light-blocking part and a transmissible part are presented to one of the eyes of a viewer who looks at the liquid crystal display screen through a polarizing plate having a polarization angle orthogonal to that of said polarizing plate; and a phase difference plate whose vertical extending direction is different from that of said phase difference plate is provided in a part facing a part of the display screen associated with the other eye to reverse said relationship of the part where the liquid crystal display screen can be observed, i.e., to transmit light in the light-blocking part and to block light in the transmissible part.

BRIEF DESCRIPTION OF THE DRAWINGS

FIG. 6 shows how a phase difference is generated by phase difference plates, in which FIG. 6A being an illustration showing a 90 deg. rotation of linearly polarized light, FIG. 6B being a waveform diagram of an ordinary ray, FIG. 6C being a waveform diagram of an extraordinary ray, and FIG. 6D being a vector diagram of an ordinary ray and an extraordinary ray.

BEST MODE FOR CARRYING OUT THE INVENTION

A mode for carrying out the invention will now be described with reference to the drawings. First, a description will be made on a principle of the invention which allows a stereoscopic image to be viewed without any crosstalk.

A general optical function component for rotating a polarization angle is a polymeric film fabricated through a uniaxial stretching process. Because of the optical anisotropy of such a film, when light enters it in a direction different from an optical axis thereof, the natural light is propagated after being separated into two linearly polarized rays orthogonal to each other. The rays have respective different refractive indices that depend on the directions thereof (such a characteristic is called birefringence) or different speeds of propagation, and this causes a phase difference between those rays when they have exited a medium.

The phase difference can be adjusted by changing the thickness of the medium. Typical optical function components of this type include components that transform linearly polarized light into circularly polarized light (¼-wave plates) or components that transform the same into linearly polarized light orthogonal thereto (½-wave plates).

Figures 6A, 6B, 6C, 6D:
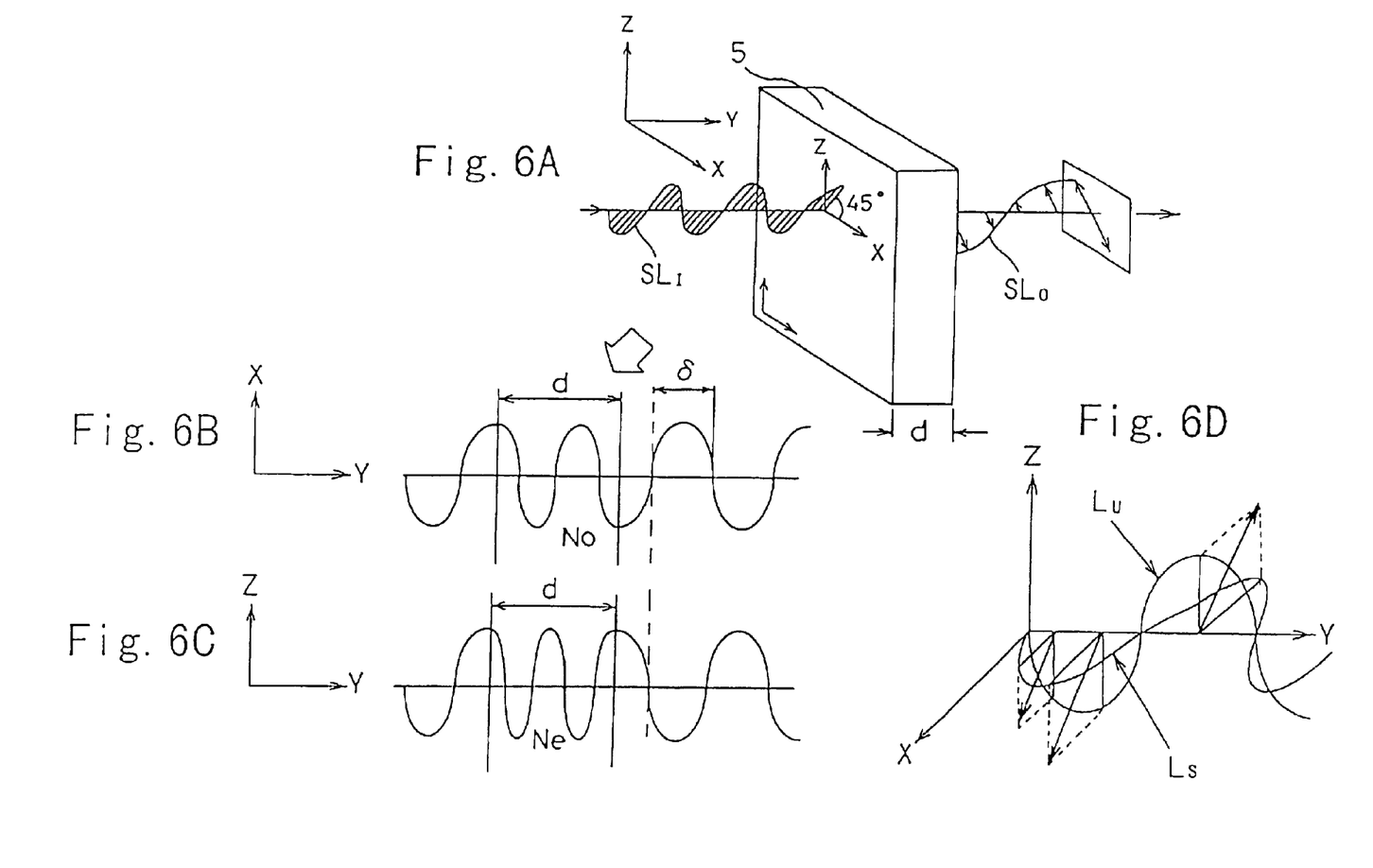

For example, linearly polarized light $SL_1$ oscillating in a direction at 45 deg. from an X-axis in an XZ-plane is caused to enter a medium (a ½-wave plate 5) perpendicularly in the direction of a Y-axis as shown in FIG. 6A, the optical axis being the Z-direction. At this time, the incident light travels in the medium after being separated into a component oscillating in the direction of the Z-axis (an extraordinary ray $L_U$) and a component oscillating in the direction of the X-axis (an ordinary ray $L_S$) as shown in FIG. 6D, the rays being equal in amplitude.

However, since they have different refractive indices in the medium, the speed of the extraordinary ray in FIG. 6C in the medium is lower than that of the ordinary ray in FIG. 6B when Ne>No where Ne represents the refractive index of the extraordinary ray and No represents the refractive index of the ordinary ray, which results in a phase difference $\delta$ between those rays when they have exited the ½-wave plate 5. The phase difference $\delta$ between those rays after they pass through the medium is expressed by the following equation where d represents the thickness of the medium.

$$\delta = 2\pi d(Ne-No)/\lambda \qquad (1)$$

Therefore, when the thickness d of the ½-wave plate 5 is adjusted using a transmission wavelength $\lambda$ in the medium such that the phase difference $\delta$ will become a ½ wavelength ($\pi$), a composite ray formed by the extraordinary ray and the ordinary ray that have exited has a polarization plane that is linearly polarized light $SL_O$ which draws a straight line in the XZ-plane and have a polarization angle that is further rotated 90 deg. in a positive direction, as shown in FIG. 6A.

A difference $\Delta N=Ne-No$ between the refractive indices in Equation (1) is called birefringence, and $\Delta N$ (birefringence) depends on the wavelength $\lambda$ as expressed by the following equation.

$$\Delta N(\lambda) = A + B/(\lambda^2 - \lambda_O^2) \qquad (2)$$

where A and B represent constants, and $\lambda_O$ represents a wavelength at an absorption edge.

Equation (2) indicates that a wavelength dispersion property of $\Delta N$ (birefringence) is not related to conditions of the step of producing the stretched film but determined by the material of the same. The wavelength dispersion properties of various stretched films are as shown in FIG. 7 and, in particular, PVA (polyvinyl alcohol) is frequently used as a material of a phase difference plate because it has a relatively low wavelength dispersion property.

Figure 7:
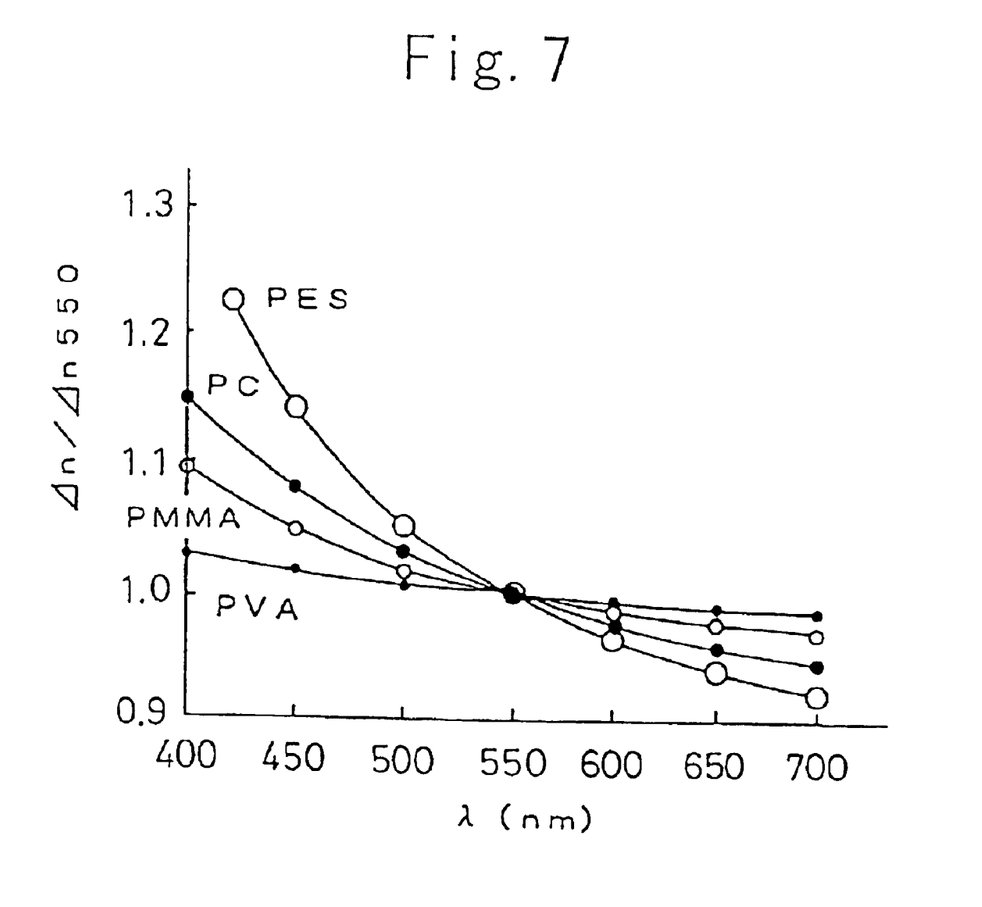
FIG. 7 is a characteristic diagram showing wavelength dispersion properties of birefringence of various stretched films.

In FIG. 7, PES, PC, PMMA, and PVA represent the wavelength dispersion properties of polyether sulfone, polycarbonate, poly methyl methacrylate, and polyvinyl alcohol, respectively.

It is relatively easy to achieve a transmissible state of two polarizing plates that have been in a light-blocking state in which they are opposite to each other with their polarization angles orthogonal to each other by providing a ½-wave plate between them to rotate the polarization angle substantially 90 deg. In addition, it is not essential to achieve a 100% open state in changing the closed state (light-blocking state) to the open state (transmissible state).

Conversely, light can not be completely blocked by providing a ½-wave plate between two polarizing plates which are opposite to each other with their polarization angles in parallel with each other because the entire region of visible light cannot be rotated 90 deg. by the ½-wave plate due to the wavelength dependence of birefringence. A leakage of light of only a few percent can cause crosstalk at stereoscopic polarization glasses as described above because it can be recognized.

The root cause has resided in the attempt of closing the open state. The following resolution was invented by revising this thinking and by focusing on the fact that the closing operation to obscure something may be replaced with an opening operation to restore two eyes to sight from a normal state in which they are completely closed.

Two phase difference plates as described above (½-wave plates 5, for example) are prepared, and the phase difference between them is canceled in a region where their optical axes are orthogonal by rotating the coordinate axis 90 deg. to realize a state in which the phase difference plates seem as if they do not exist. This can be understood from the fact that Equation (1) is changed to read (No−Ne) instead of (Ne−No), which means that the polarization is returned to the initial state according to the rotation.

That is, when $\Delta$ represents a new phase difference generated by making the optical axes of the phase difference plates constituted by two polymeric films having similar wavelength dispersion properties orthogonal to each other, $$\Delta = \{2\pi d(Ne-No)/\lambda\} + \{2\pi d(No-Ne)/\lambda\} = 0 \qquad (3)$$

Figure 1:
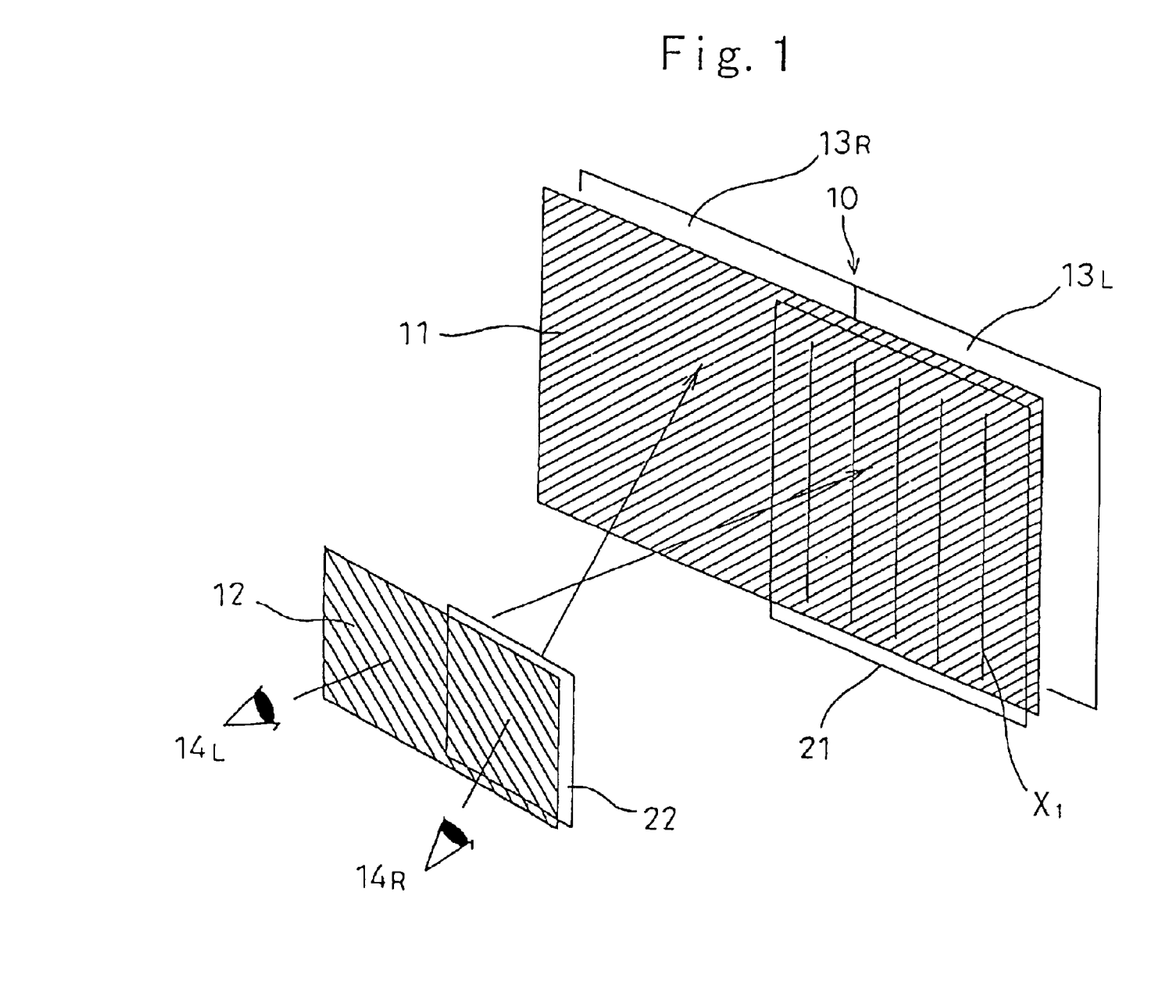
FIG. 1 is a configuration diagram showing an example of a mode for carrying out the invention.

A first mode for carrying out the invention will now be described. In general, a liquid crystal display is configured by sandwiching a liquid crystal whose molecular twist angle can be controlled by a voltage with two polarizing plates whose polarization angles are orthogonal to each other. In FIG. 1, for example, a polarizing plate 11 (a first polarizing plate) having a rightward and upward polarization angle is disposed on a display screen 10 of a liquid crystal display. A ½-wave plate 21 (a first phase difference plate) is applied to a right half of the polarizing plate 11 as viewed from a viewer such that an optical axis $X_1$ thereof is at 45 deg. to the polarization angle of the polarizing plate 11.

12 represents a polarizing plate (a second polarizing plate) which has a leftward and upward polarization angle and which is disposed at a predetermined distance from said liquid crystal display, and the polarizing plate is configured as polarization glasses to be worn by a viewer. A ½-wave plate 22 (a second phase difference plate) whose optical axis is orthogonal to that of said ½-wave plate 21 is applied to a part of the polarizing plate 12 in the region of a right eye. An image $13_L$ for a left eye and an image $13_R$ for a right eye are respectively displayed on a right side and a left side of said display screen 10 bounded in the middle of the screen.

While the image $13_R$ for a right eye is completed blocked from a left eye $14_L$ of a viewer that looks through the polarizing plate 12 because the polarization angles of the polarizing plate 11 and the polarizing plate 12 are orthogonal, the image $13_L$ for a left eye can be seen because the polarization angle is rotated substantially 90 deg. by the ½-wave plate 21 located between the polarizing plates 11, 12 in an orthogonal state.

On the other hand, a right eye $14_R$ of the viewer can see the image $13_R$ for a right eye because the polarization angle is rotated substantially 90 deg. by the ½-waveplate 22 located between the polarizing plates 11, 12 in an orthogonal state. The image $13_L$ for a left eye which should not enter the right eye $14_R$ is completely blocked because the optical axes of the two phase difference plates 21, 22 located between the polarizing plates 11, 12 are in an orthogonal state and because the initial (orthogonal) polarizing state of the two polarizing plates 11, 12 is restored by the canceling effect described using Equation (3) (the cancellation of the phase difference in the part where the optical axes are in an orthogonal state because of the 90 deg. rotation of the coordinate axis and a resultant state in which the phase difference plates seem as if they do not exist). Therefore, the image $13_L$ for a left eye and the image $13_R$ for a right eye respectively enter the left and right eyes, i.e., the left eye $14_L$ and the right eye $14_R$ completely independently of each other (without any crosstalk).

Figure 2:
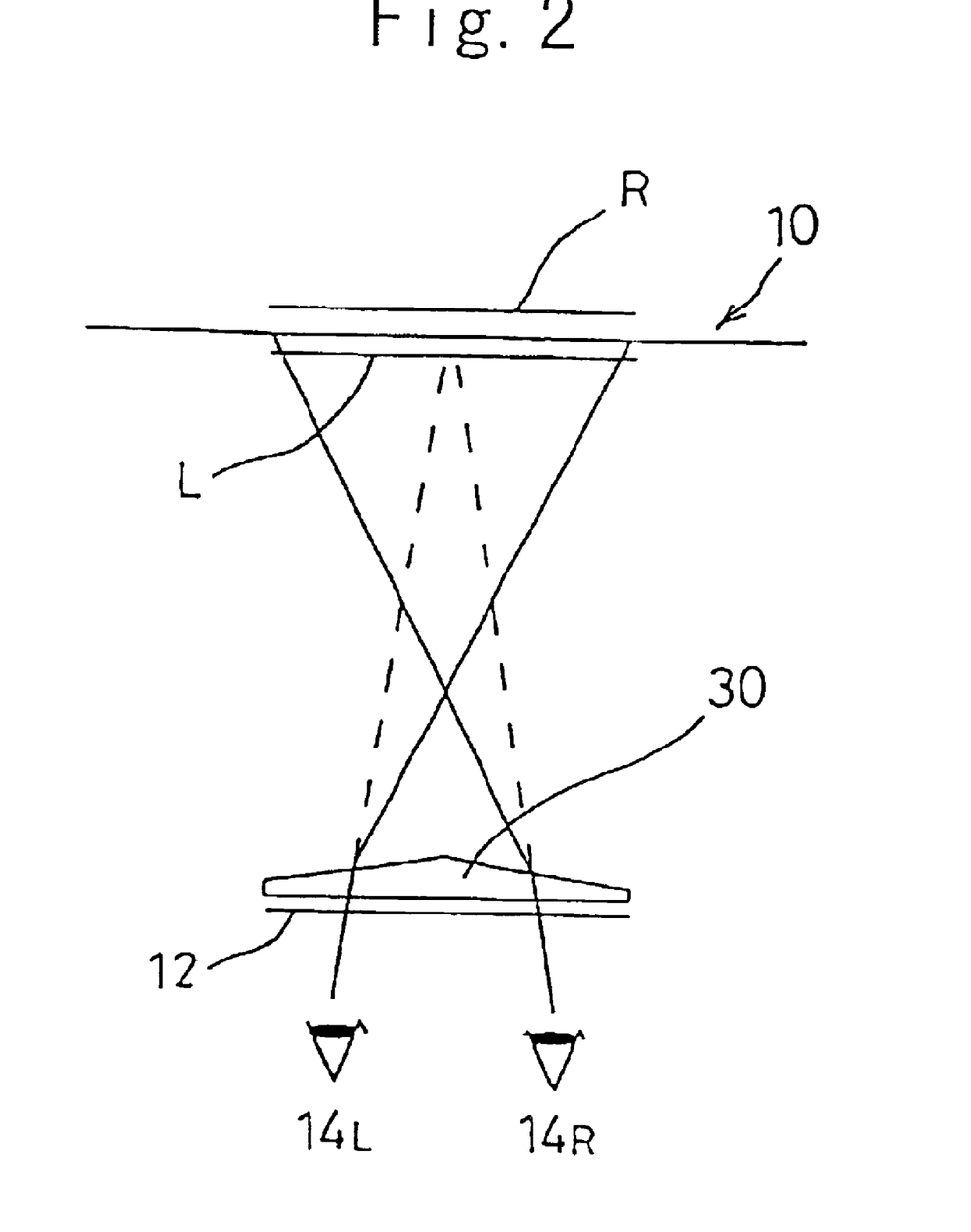
FIG. 2 is a configuration diagram showing an example of another mode for carrying out the invention.

While the left and right images may be recognized as a single image by putting the eyes closer even in the state in FIG. 1, they are made easier to recognize to form a single stereoscopic image in the brain by, for example, using an angle prism 30 in front of the polarizing plate 12 to assist the same as shown in FIG. 2, the prism being disposed on the side of the polarizing plate 12 having the ½-wave plate 22 applied thereon toward the display screen 10.

A second mode for carrying out the invention will now be described with reference to FIG. 3. An image $43_R$ for a right eye and an image $43_L$ for a left eye are respectively displayed on odd-numbered lines and even-numbered lines of a display screen 40 of a liquid crystal display. For example, a polarizing plate 11 (a first polarizing plate) having a rightward and upward polarization angle is disposed on the display screen 40.

½-wave plates 41, 41, . . . (first phase difference plates) in the form of strips are applied to line regions of the polarizing plate 11 corresponding to the image $43_L$ for a left eye on the even-numbered lines as viewed from a viewer such that their optical axes are at 45 deg. to the polarization angle of the polarizing plate 11 and, as a result, the (rightward and upward) polarization angle of the polarizing plate 11 is rotated such that it will be directed leftward and upward as illustrated.

A polarizing plate (a second polarizing plate) 12 has a leftward and upward polarization angle and is disposed at a predetermined distance from said display, and it is configured, for example, as polarization glasses to be worn by a viewer. A ½-wave plate 42 (a second phase difference plate) whose optical axis is orthogonal to that of said ½-wave plates 41 is applied to a part of the polarizing plate 12 in the region of a right eye $14_R$.

While the image $43_R$ for a right eye is completely blocked from a left eye $14_L$ of a viewer that looks through the polarizing plate 12 because the polarization angles of the polarizing plate 11 and the polarizing plate 12 are orthogonal, the image $43_L$ for a left eye can be seen because the polarization angle of the polarizing plate 11 is rotated substantially 90 deg. by the ½-wave plates 41, 41, . . . located between the polarizing plates 11, 12 in an orthogonal state.

The right eye $14_R$ of the viewer can see the image $43_R$ for a right eye because the polarization angle is rotated substantially 90 deg. by the ½-wave plate 42 located between the polarizing plates 11, 12 in an orthogonal state. The image $43_L$ for a left eye which should not enter the right eye $14_R$ is completely blocked because the optical axes of the two phase difference plates 41, 41, . . . and the phase difference plate 42 located between the polarizing plates 11, 12 are in an orthogonal state and because the initial (orthogonal) polarizing state of the two polarizing plates 11, 12 is restored by the canceling effect described using Equation (3) (the cancellation of the phase difference in the part where the optical axes are in an orthogonal state because of the 90 deg. rotation of the coordinate axis and a resultant state in which the phase difference plates seem as if they do no exist). Therefore, the image $43_L$ for a left eye and the image $43_R$ for a right eye respectively enter the left and right eyes, i.e., the left eye $14_L$ and the right eye $14_R$ completely independently of each other (without crosstalk) to form a single stereoscopic image in the brain.

Figure 3:
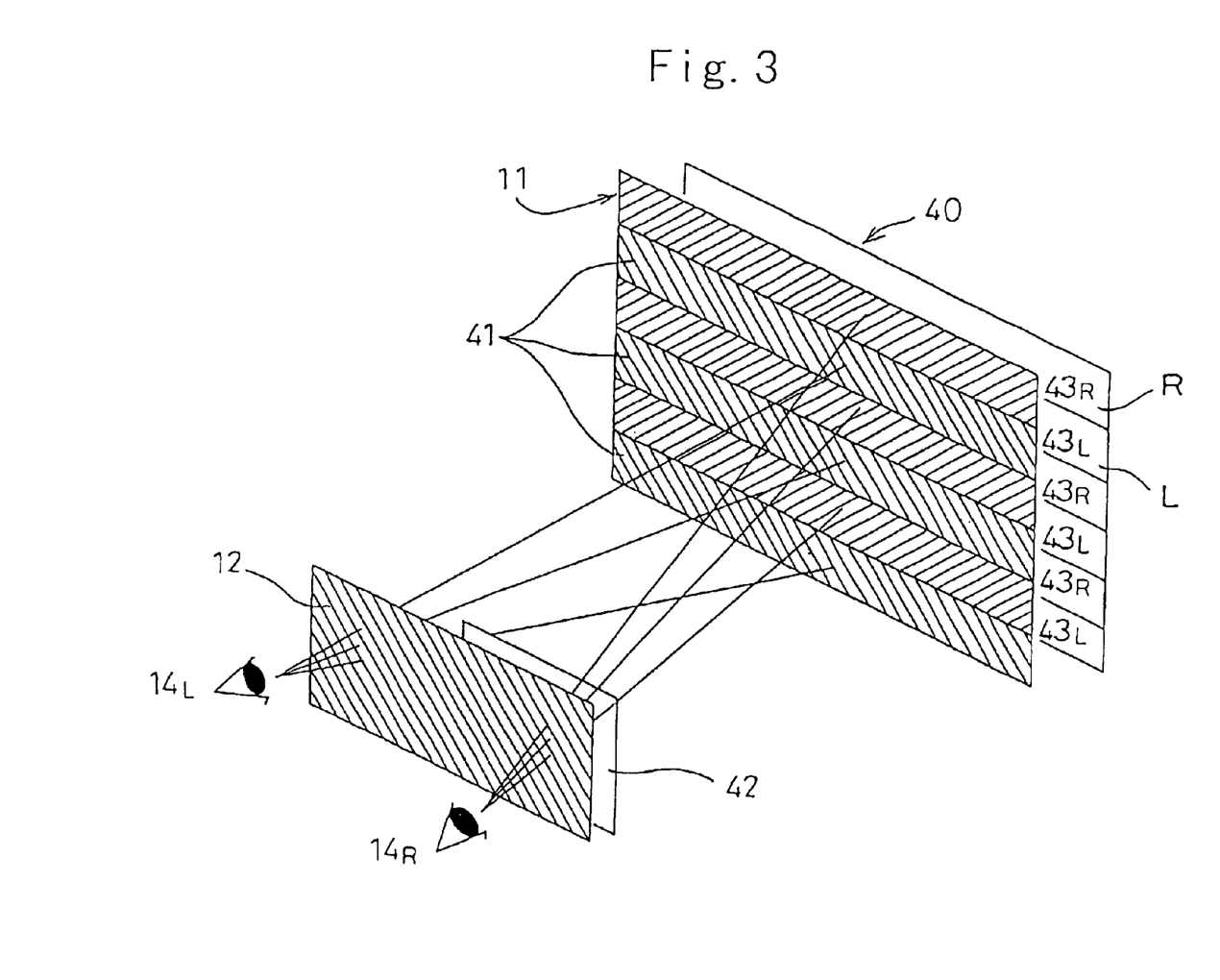
FIG. 3 is a configuration diagram showing an example of another mode for carrying out the invention.
Figure 4:
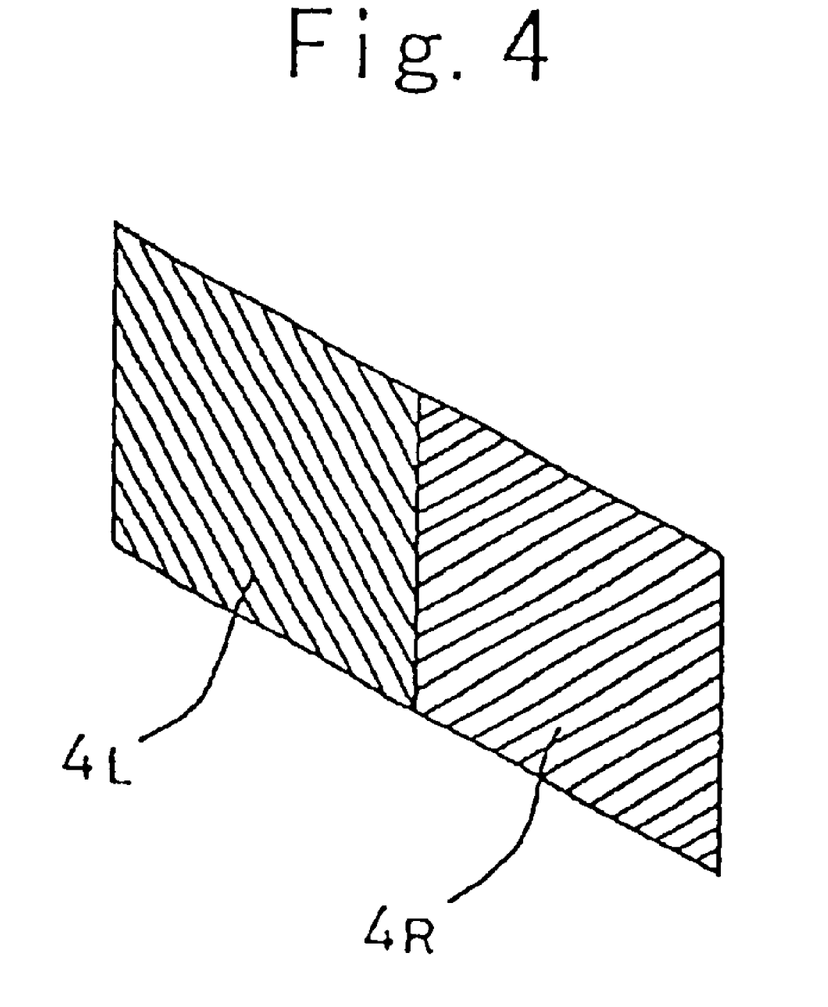
FIG. 4 is a configuration of a major part of a conventional apparatus for explaining problems with the same.

As shown in FIG. 4, an alternative method is possible in which a polarizing plate $4_L$ having a leftward and upward polarization angle is worn over the left eye and a polarizing plate $4_R$ having a rightward and upward polarization angle is worn over the right eye to see the image $43_L$ for a left eye in FIG. 3. In this case, no problem occurs with the left eye because the image $43_R$ for a right eye whose polarization angle is orthogonal is completely blocked and because only the image $43_L$ for a left eye whose polarization angle is rotated substantially 90 deg. by the ½-wave plates 41, 41, . . . becomes transmissible and visible. However, while the image $43_R$ for a right eye with a matching polarization angle is transmissible and visible to the right eye, the image $43_L$ for a left eye can not be completely blocked throughout the wavelength thereof with the ½-wave plates 41, 41, . . . that are wavelength dependent. This results in a problem that there will be a stereoscopic image with crosstalk.

According to the invention, the polarization angles of said polarizing plates and the positions of the phase difference plates are not limited to the said modes for carrying out the invention. Specifically, referring to FIG. 1, a configuration may be employed in which the polarizing plate 11 has a leftward and upward polarization angle; the polarizing plate 12 has a rightward and upward polarization angle; and the ½-wave plate 21 and the ½-wave plate 22 are respectively applied to the side of the polarizing plate 11 toward the image $13_R$ for a right eye and the side of the polarizing plate 12 toward the left eye $14_L$. Referring to FIG. 3, a configuration may be employed in which the polarizing plate 11 has a leftward and upward polarization angle; ½-wave plates in the form of strips are applied to line regions corresponding to the image $43_L$ for a left eye on the even-numbered lines such that their optical axes are opposite to those of said ½-wave plates 41, 41, . . . : the polarizing plate 12 has a rightward and upward polarization angle; and said ½-wave plate 42 is applied to the side of the polarizing plate 12 toward the right eye $14_R$.

As described above, according to the invention, an image for a left eye and an image for a right eye respectively enter a left eye and a right eye completely independently of each other, which makes it possible to view a stereoscopic image without crosstalk.

Although a phase difference plate cannot accurately rotate the entire region of visible light a predetermined angle only by itself because it has wavelength dependence (the rotating angle varies depending on wavelengths), crosstalk can be completely eliminated without any influence of said wavelength dependence. Therefore, it is not essential to form the phase difference plates from a material having good characteristics, and no problem occurs if the first and second phase difference plates are constituted by phase difference plates having the same wavelength dependence even if they are made from a material whose characteristics are somewhat poor. This increases freedom in selecting a material for the phase difference plates. Further, since a material having somewhat poor characteristics as described above can be used for the phase difference plates, the apparatus as a whole can be manufactured at a low cost.

INDUSTRIAL APPLICABILITY

While the above-described examples of modes for carrying out the invention are applications of the invention to a stereoscopic image display utilizing a liquid crystal device, the invention is not limited by the same and may be applied to other apparatus for viewing stereoscopic images.

What is claimed is:

1. A stereoscopic display utilizing an image separator comprising:

a first polarizing plate on a display screen;

a first phase difference plate in a predetermined part of a front surface of said first polarizing plate;

a second polarizing plate at a predetermined distance from said display screen, wherein said second polarizing plate has polarizing characteristics in intransmissible relationship with said first polarizing plate; and a second phase difference plate in a predetermined part of said second polarizing plate toward the display screen, wherein an absolute value of a polarization of the second phase differenced plate is identical to a polarization angle of said first phase difference plate and the polarization angle of the second phase plate difference plate is opposite to the polarization angle of the first phase difference plate in a rotating direction.

2. A stereoscopic display apparatus utilizing polarized glasses comprising:

a first polarizing plate on display screen;

a first phase difference plate in a predetermined part of a front surface of said first polarizing plate;

a second polarizing plate at said polarized glasses located at a predetermined distance from said display screen and wherein the second polarizing plate has polarizing characteristic in an intransmissible relationship with said first polarizing plate; and a second phase difference plate in a predetermined part of said second polarizing plate toward the display screen, wherein an absolute value of a polarization angle of the second phase difference plate is identical to a polarization angle of said first phase difference plate and the polarization angle of the second phase difference plate is opposite to the polarization angle of the first phase difference plate in a rotating direction.

3. The stereoscopic display apparatus according to claim 2, wherein said first phase difference plate and said second phase difference plate are in association with one of a left division or a right division of said display screen.

4. The stereoscopic display apparatus according to claim 2, wherein said first phase difference plate is in association with one of even-numbered scan lines or odd-numbered scans lines on said display screen, and wherein said second phase difference plate is in association with one of a left division or a right division of said display screen.

* * * * *